US009636528B2

United States Patent
Casebolt et al.

(10) Patent No.: US 9,636,528 B2
(45) Date of Patent: *May 2, 2017

(54) ROPE GRAB

(71) Applicant: D B Industries, LLC, Red Wing, MN (US)

(72) Inventors: Scott C. Casebolt, St. Paul Park, MN (US); John P. Blomberg, New Ulm, MN (US)

(73) Assignee: D B Industries, LLC, Red Wing, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,710

(22) Filed: Aug. 21, 2015

(65) Prior Publication Data

US 2015/0352383 A1    Dec. 10, 2015

Related U.S. Application Data

(63) Continuation of application No. 13/551,845, filed on Jul. 18, 2012, now Pat. No. 9,132,297.

(51) Int. Cl.
*A62B 35/00* (2006.01)
*A62B 1/14* (2006.01)
(Continued)

(52) U.S. Cl.
CPC ............ *A62B 35/0037* (2013.01); *A62B 1/14* (2013.01); *A62B 35/0081* (2013.01);
(Continued)

(58) Field of Classification Search
CPC ... A62B 1/14; A62B 35/0081; A62B 35/0087; A62B 35/00; A62B 35/0037; A62B 35/005; B61H 9/02
See application file for complete search history.

(56) References Cited

U.S. PATENT DOCUMENTS 2,561,514 A * 7/1951 Houseman ............... A62B 1/14
                                                                         182/5
2,606,350 A    8/1952 French
(Continued)

FOREIGN PATENT DOCUMENTS

CA        1030732      5/1978
DE        28 12 073    6/1979
(Continued)

OTHER PUBLICATIONS

Advisory Action/Examiner-Initiated Interview Summary for U.S. Appl. No. 13/551,845, mailed Mar. 24, 2015.
(Continued)

*Primary Examiner* — Alvin Chin-Shue
*Assistant Examiner* — Shiref Mekhaeil
(74) *Attorney, Agent, or Firm* — Dicke, Billig & Czaja, PLLC

(57) ABSTRACT

A rope grab for a vertical fall protection system is provided. The rope grab includes a housing with an elongated member passage. The elongated member passage is configured to receive an elongated member. A locking cam is pivotally coupled to the housing and selectively engages an elongated member received in the elongated member passage. A cam spring is coupled between the housing and the locking cam to provide a relatively slight biasing force on the locking cam in a direction towards an elongated member received in the elongated member passage. A locking arm, pivotally coupled to the housing, has a first end that is configured to be coupled to a safety harness of a user and a second end that selectively engages the locking cam to lock the locking cam on an elongated member in the elongated member passage during a fall event.

14 Claims, 13 Drawing Sheets

(51) Int. Cl.
*F16B 2/18* (2006.01)
*A62B 35/04* (2006.01)

(52) U.S. Cl.
CPC ............... *A62B 35/04* (2013.01); *F16B 2/18* (2013.01); *F16B 2/185* (2013.01); *Y10T 24/3944* (2015.01)

(56) References Cited

U.S. PATENT DOCUMENTS

| | | | |
|---|---|---|---|
| 3,177,543 A | | 4/1965 | Fountain |
| 3,179,994 A | | 4/1965 | Meyer et al. |
| 3,811,155 A | * | 5/1974 | Stafford .................. A62B 1/14 182/5 |
| 3,852,943 A | * | 12/1974 | Healy ..................... A62B 1/14 16/257 |
| 3,876,036 A | | 4/1975 | Sweet |
| 4,059,871 A | * | 11/1977 | Swager .................... A62B 1/14 182/5 |
| 4,071,926 A | | 2/1978 | Sweet et al. |
| 4,077,094 A | * | 3/1978 | Swager .................... A62B 1/14 182/5 |
| 4,521,000 A | * | 6/1985 | Dodge, Jr. ......... A62B 35/0087 182/5 |
| 4,542,884 A | | 9/1985 | Dodge, Jr. |
| 4,560,029 A | * | 12/1985 | Dalmaso ............... A62B 35/04 182/112 |
| 4,657,110 A | * | 4/1987 | Wolner .................. A62B 35/04 182/192 |
| 4,791,243 A | | 12/1988 | Ibanez et al. |
| 4,846,075 A | * | 7/1989 | Tupper .................... A62B 1/14 104/204 |
| 5,146,655 A | * | 9/1992 | Gibbs .................... A44B 99/00 188/65.2 |
| 5,156,240 A | * | 10/1992 | Ostrobrod ................ A62B 1/14 182/193 |
| 5,224,427 A | | 7/1993 | Riches et al. |
| 5,265,696 A | * | 11/1993 | Casebolt .................. A62B 1/14 182/192 |
| 5,638,919 A | * | 6/1997 | Pejout ..................... A62B 1/14 182/192 |
| 5,860,493 A | * | 1/1999 | Cherpitel ................. A62B 1/14 182/193 |
| 5,924,522 A | | 7/1999 | Ostrobrod |
| 6,019,195 A | * | 2/2000 | Pelofi ...................... A62B 1/14 182/192 |
| 6,056,086 A | * | 5/2000 | Gortan ................... A62B 35/04 182/197 |
| 6,279,680 B1 | | 8/2001 | Casebolt |
| 6,457,556 B1 | * | 10/2002 | Skade .................... A62B 35/04 182/18 |
| 6,511,249 B2 | | 1/2003 | Pelofi et al. |
| 6,725,969 B1 | | 4/2004 | Meister |
| 6,918,464 B2 | | 7/2005 | Renton et al. |
| 7,188,704 B2 | | 3/2007 | Renton et al. |
| 7,647,677 B2 | * | 1/2010 | Casebolt ................ F16B 45/02 24/600.1 |
| 7,708,116 B2 | * | 5/2010 | Martin .................... A62B 1/14 182/8 |
| 8,550,225 B2 | * | 10/2013 | Blomberg .............. A62B 35/04 188/371 |
| 8,584,797 B2 | | 11/2013 | Krauss |
| 8,720,014 B2 | * | 5/2014 | Chen ....................... A62B 1/14 24/132 R |
| 8,733,739 B2 | * | 5/2014 | Mauthner ................ A62B 1/14 254/391 |
| 2002/0014370 A1 | * | 2/2002 | Casebolt .................. A62B 1/14 182/5 |
| 2002/0175025 A1 | | 11/2002 | Kurtgis |
| 2007/0119653 A1 | * | 5/2007 | Brown ..................... A62B 1/14 182/36 |
| 2009/0133977 A1 | | 5/2009 | Warren |
| 2009/0194366 A1 | | 8/2009 | Parker et al. |
| 2010/0012424 A1 | * | 1/2010 | Krauss .................... A62B 1/14 182/3 |
| 2010/0126802 A1 | | 5/2010 | Delaittre et al. |
| 2011/0186388 A1 | * | 8/2011 | Sudale ............... A62B 35/0081 188/65.2 |
| 2014/0020988 A1 | * | 1/2014 | Casebolt ............ A62B 35/0081 188/65.1 |

FOREIGN PATENT DOCUMENTS

| | | |
|---|---|---|
| DE | 28 10 928 | 9/1979 |
| DE | 86 06 240 U1 | 6/1986 |
| DE | 35 31 391 A1 | 3/1987 |
| DE | 202 17 045 U1 | 5/2003 |
| DE | 20 2005 011 338 U1 | 12/2006 |
| DE | 20 2007 012 804 U1 | 2/2009 |
| EP | 0 168 021 | 1/1986 |
| EP | 2 407 211 | 1/2012 |
| FR | 2 539 477 | 7/1984 |
| FR | 2 555 060 | 5/1985 |
| FR | 2 857 601 | 1/2005 |
| GB | 1 536 354 | 12/1978 |
| GB | 2 396 195 B | 6/2004 |
| WO | WO 96/23951 | 8/1996 |
| WO | WO 00/60209 | 10/2000 |
| WO | WO 2005/058422 A1 | 6/2005 |
| WO | WO 2006/056790 A1 | 6/2006 |
| WO | WO 2009/037173 A1 | 3/2009 |
| WO | WO 2009/100315 A2 | 8/2009 |

OTHER PUBLICATIONS

International Search Report for PCT/US2010/047097 mailed Dec. 2, 2010.
International Search Report for Application Serial No. PCT/US2013/050868 mailed Jul. 2, 2014.
Office Action for U.S. Appl. No. 13/551,845, mailed Aug. 15, 2014.
Office Action for U.S. Appl. No. 13/551,845, mailed Dec. 15, 2014.
Office Action mailed Dec. 29, 2014 for U.S. Appl. No. 13/891,871.
SE 70, Operation & Maintenance instructions for the Söll Vi-Go type safe climbing system with guided type fall arrester, (Miller by Sperian) Sep. 10, 2008 [online], [retrieved on May 7, 2009] Retrieved from the Vi-Go—Vertical Arrest System webpage <http://www.steigschutz.de/xist4c/web/Vi-Go__id__14703_.htm>, 21 pages.
First Examination Report, Saudi Arabian Patent Application No. 113340725, mailed Oct. 28, 2015.

\* cited by examiner

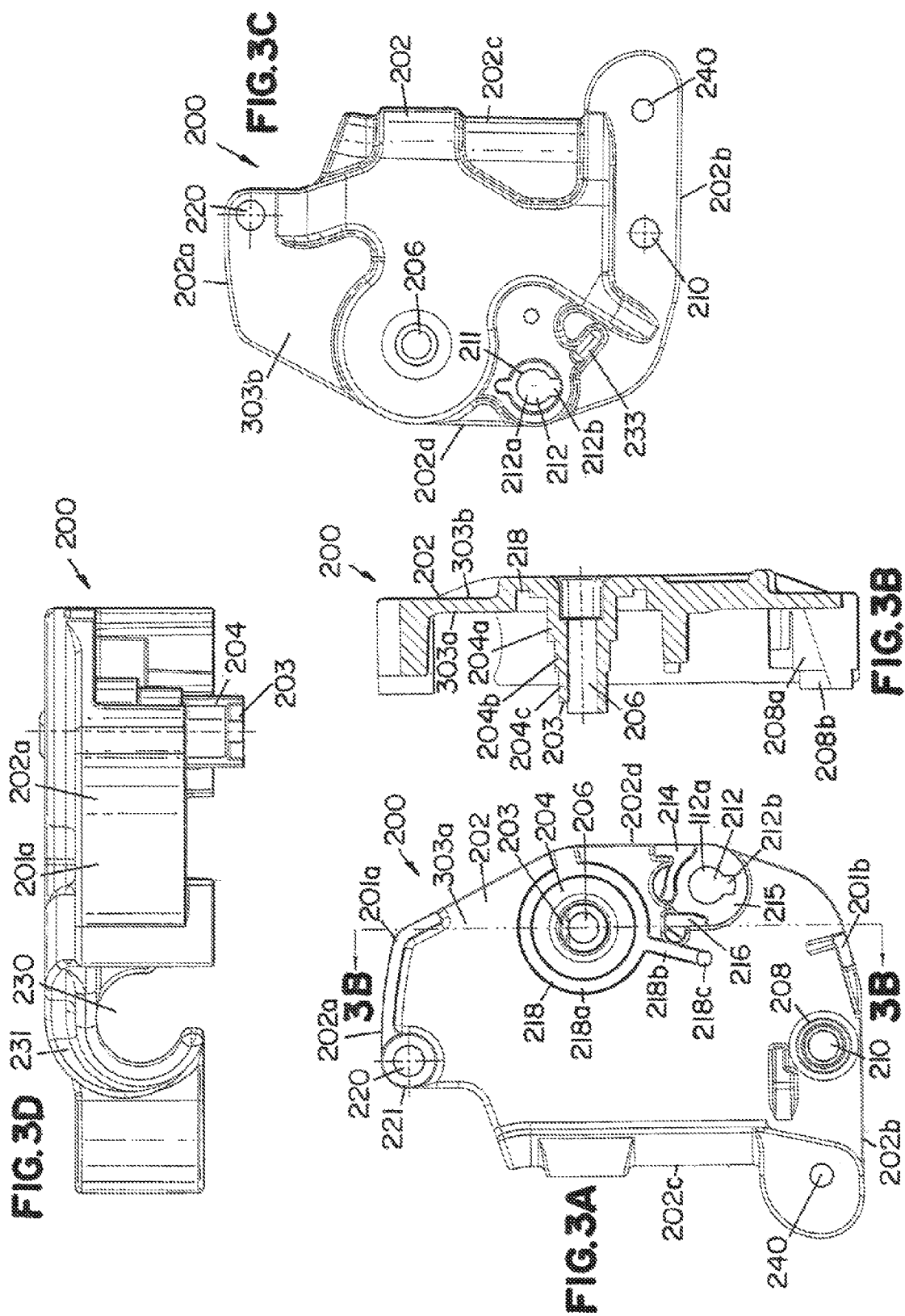

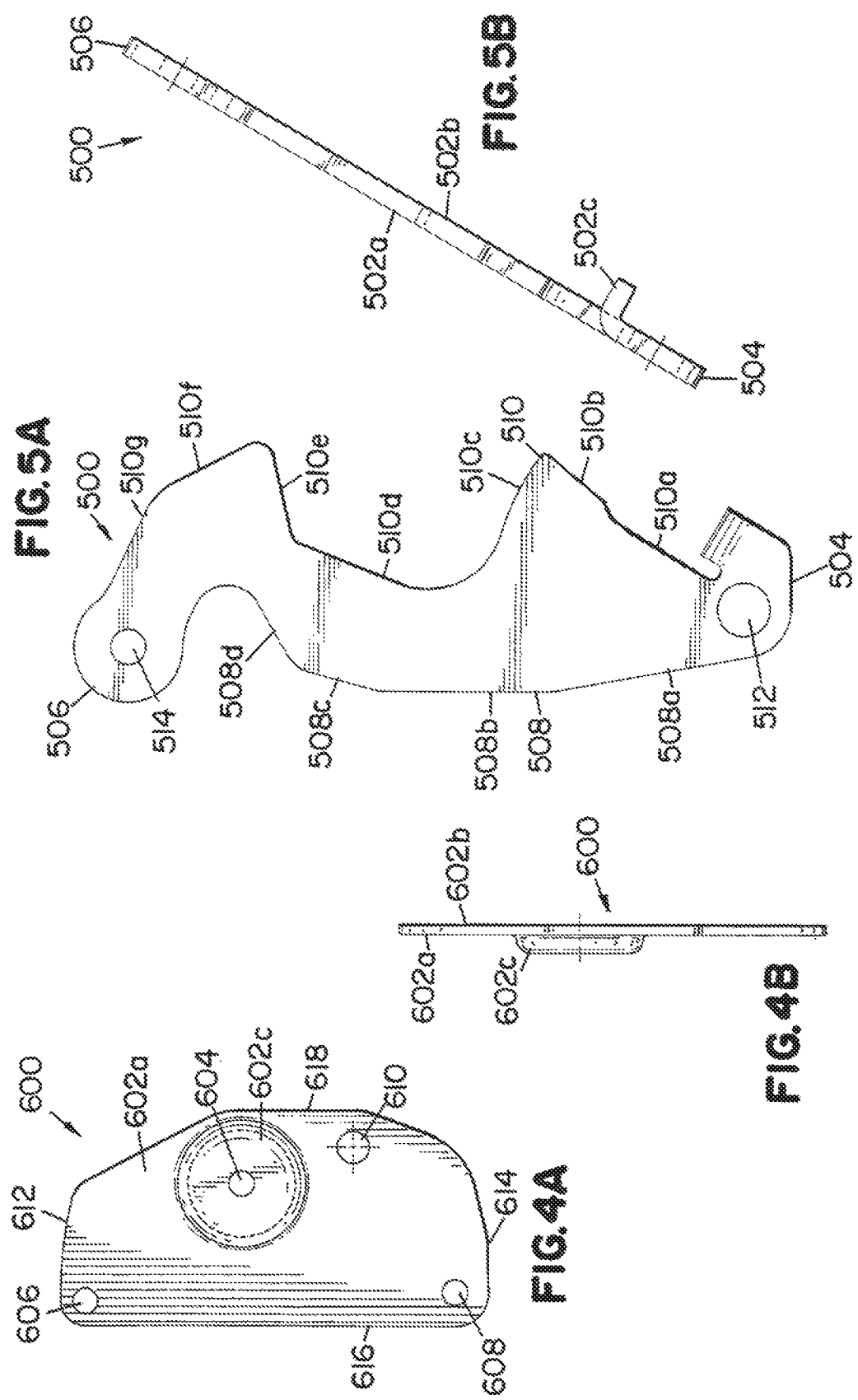

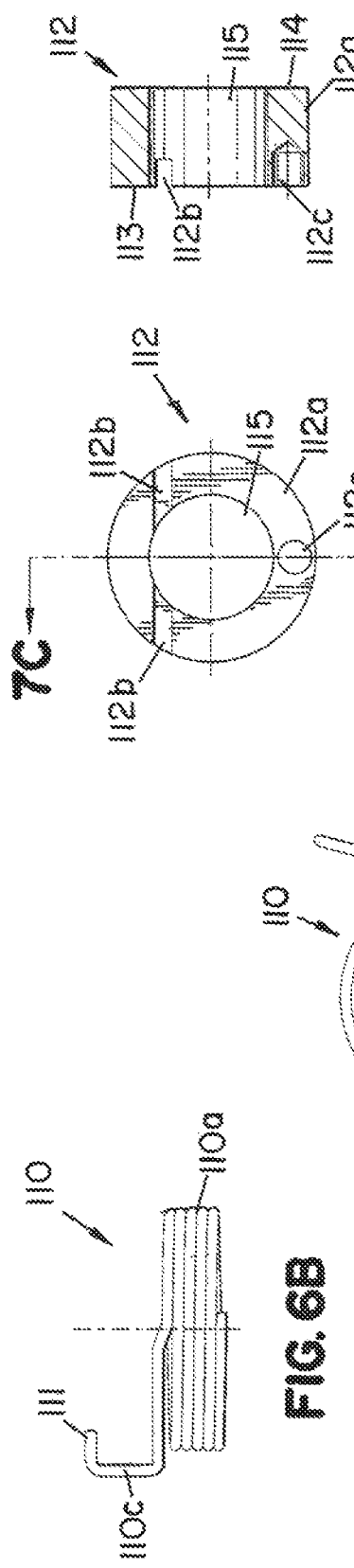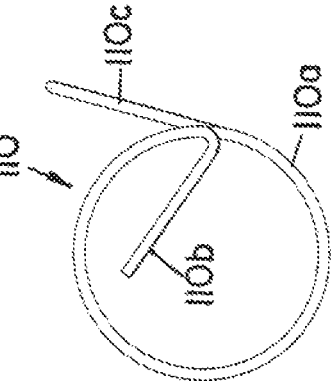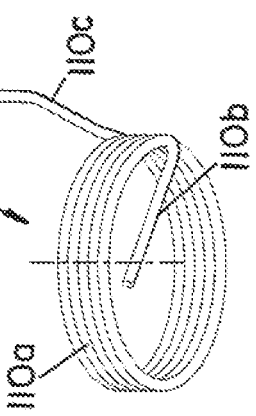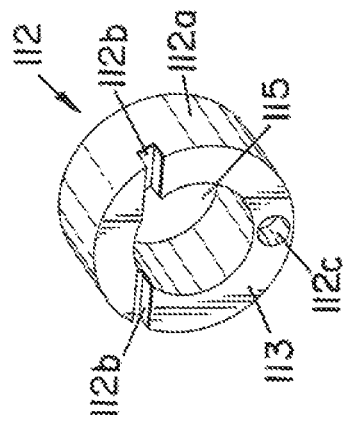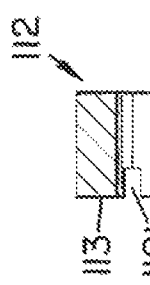

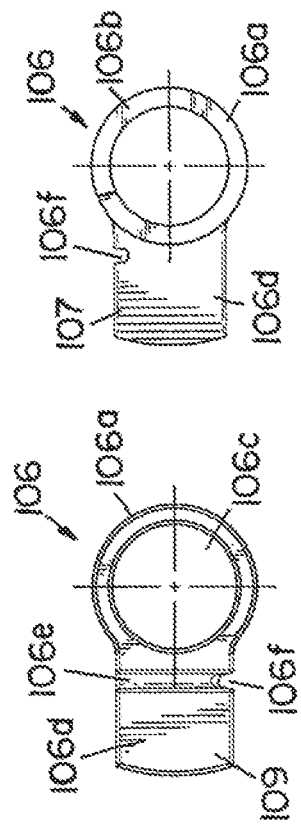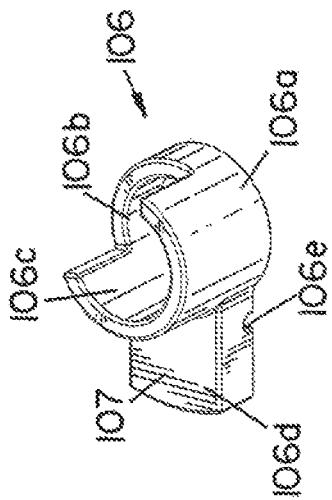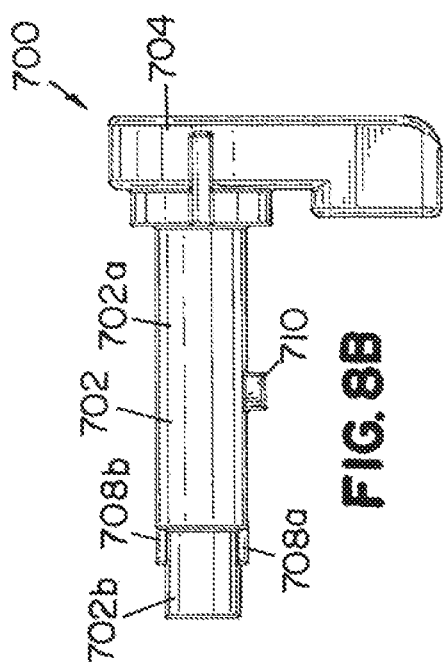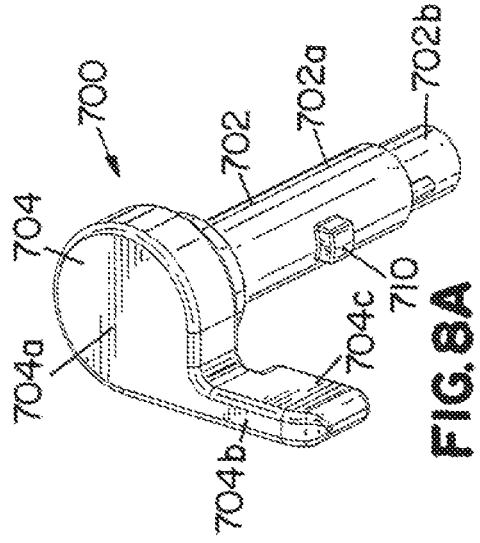

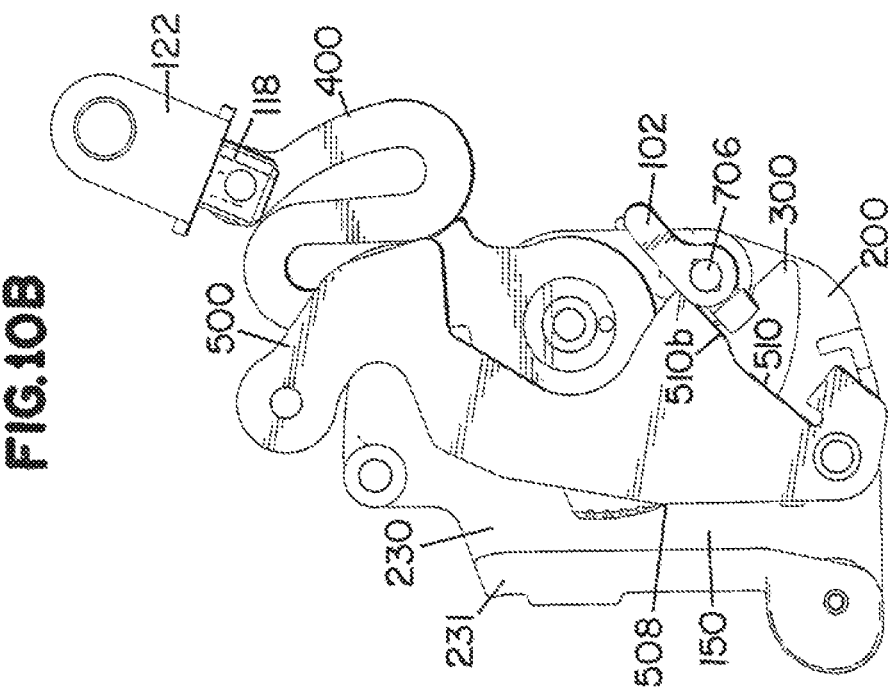
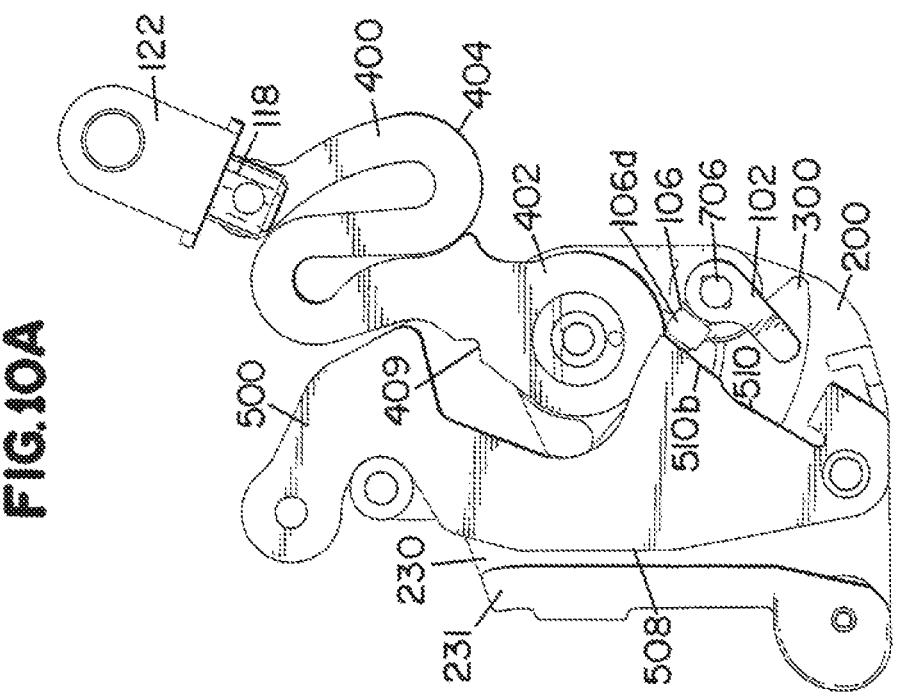

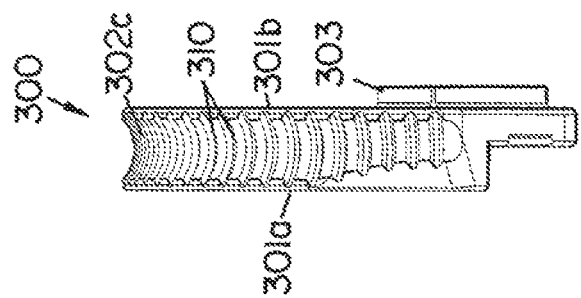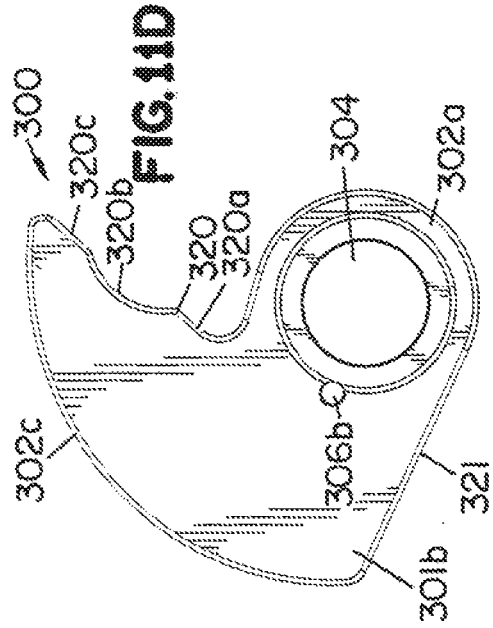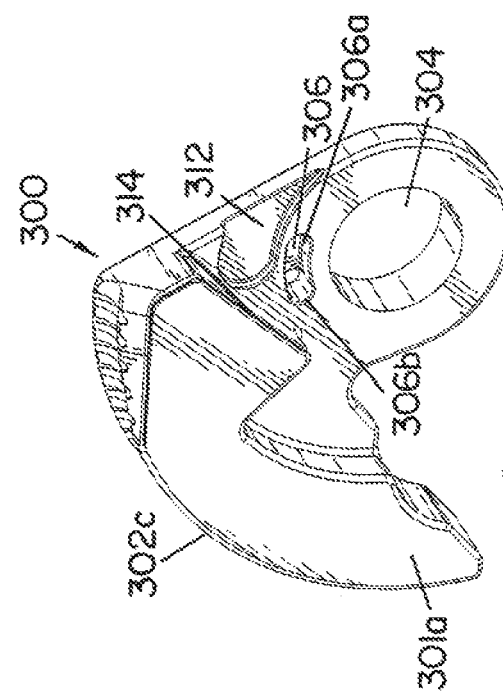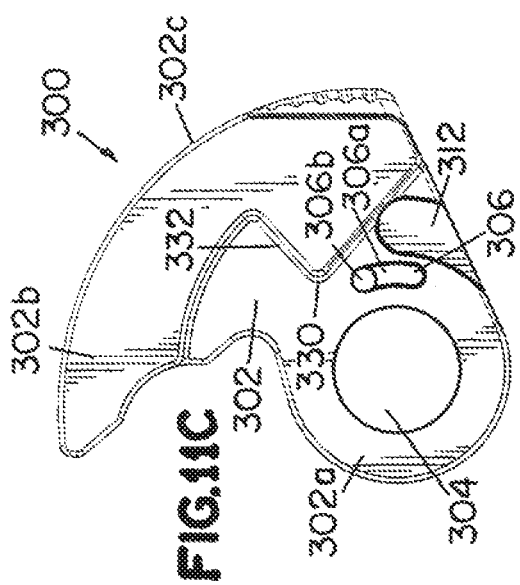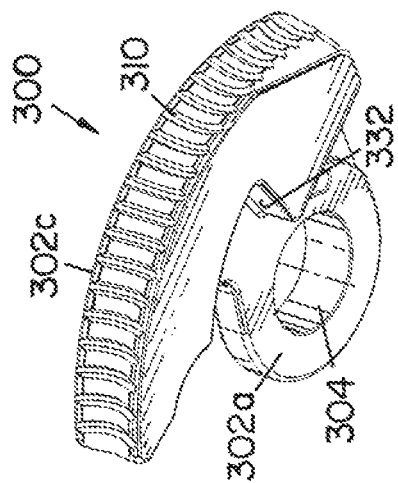

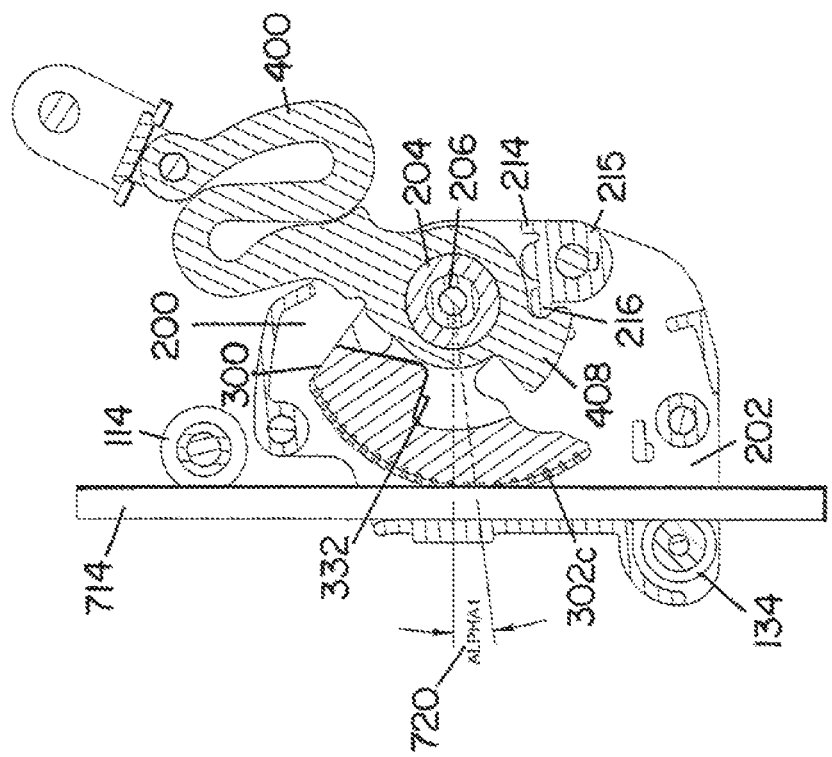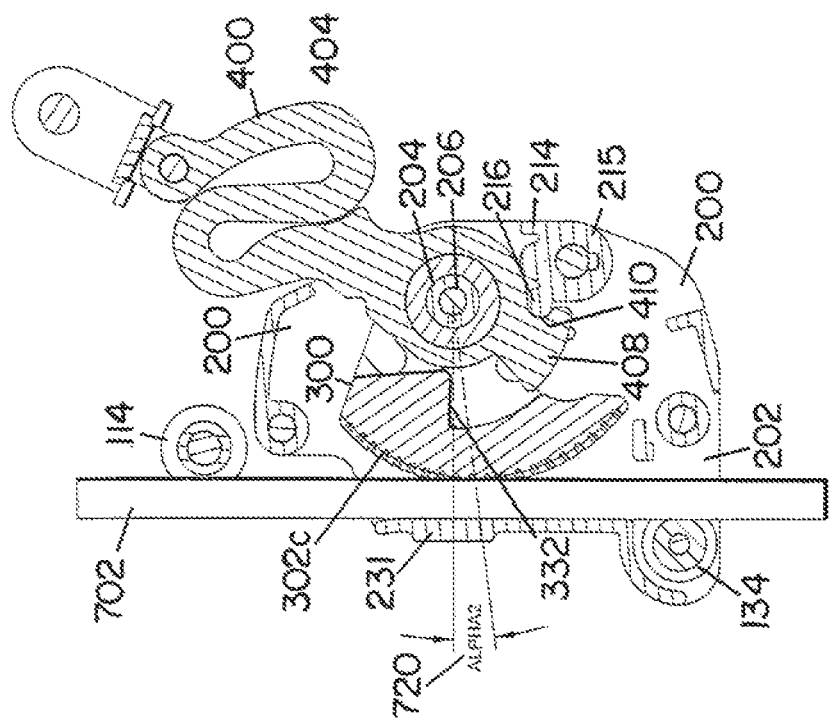

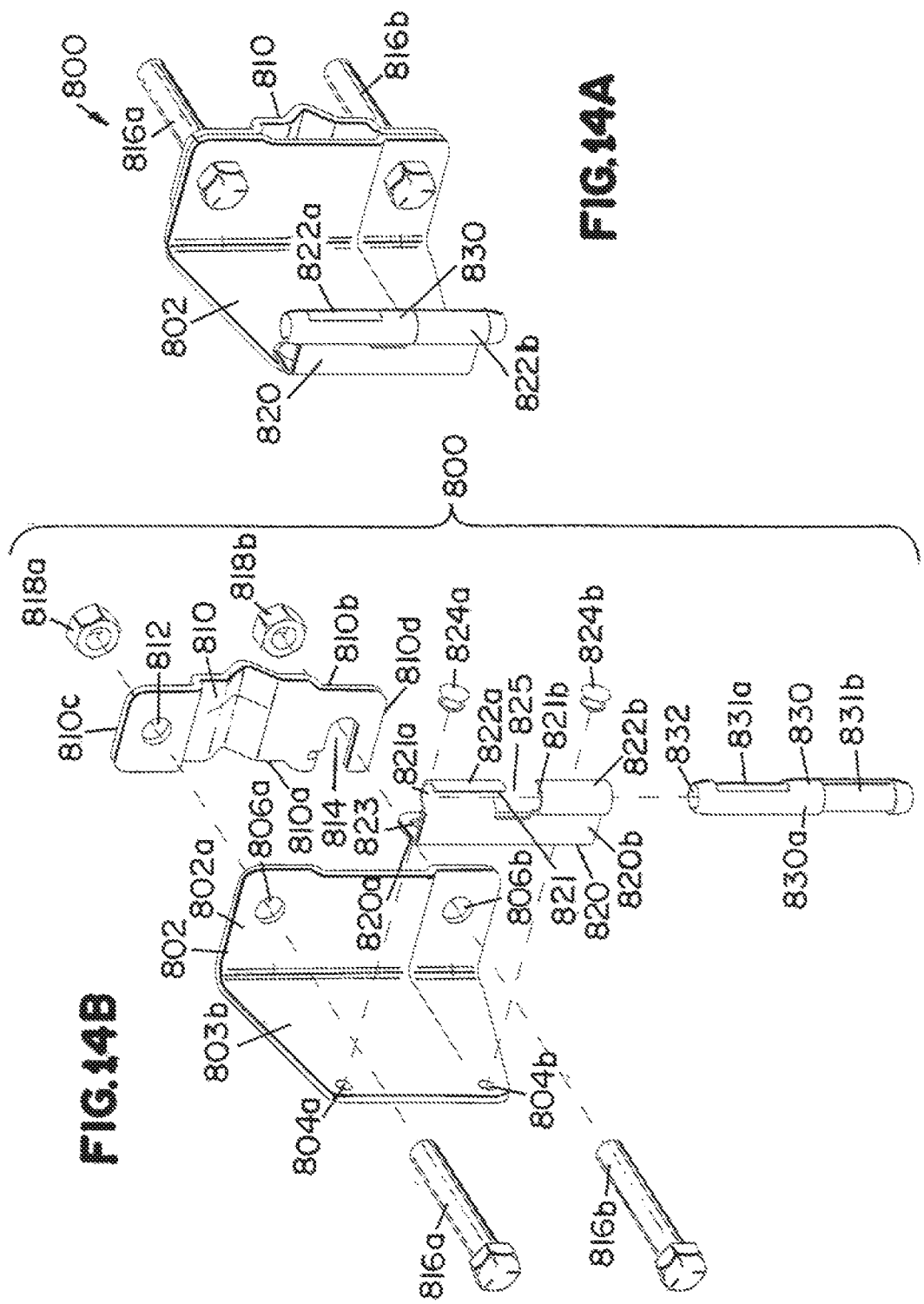

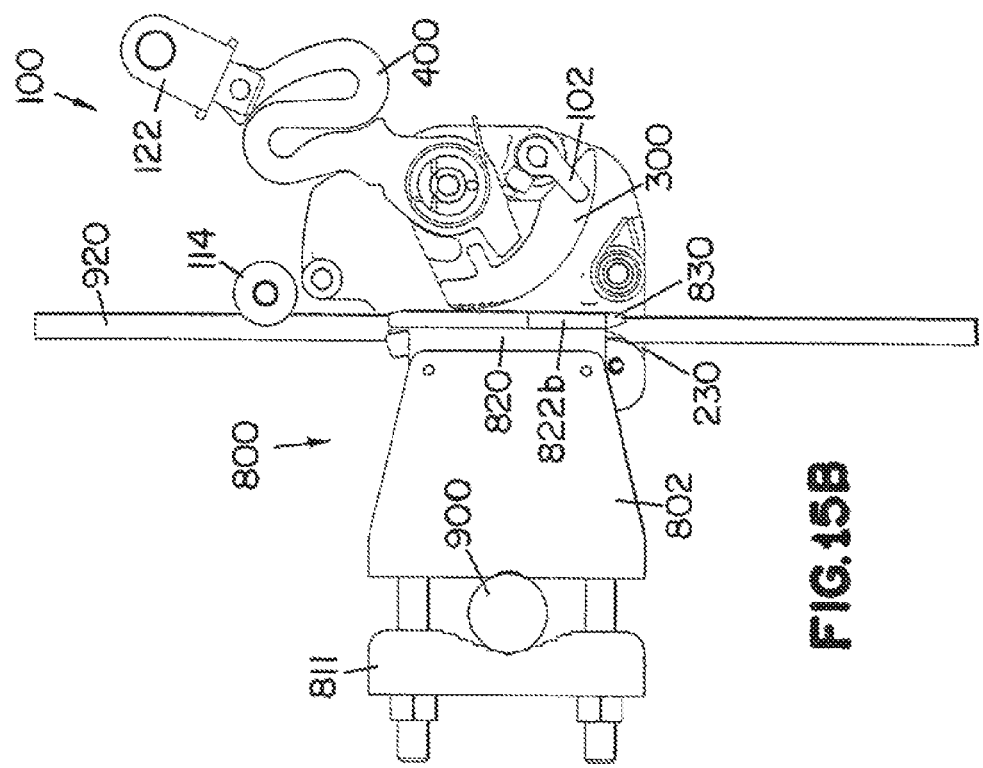
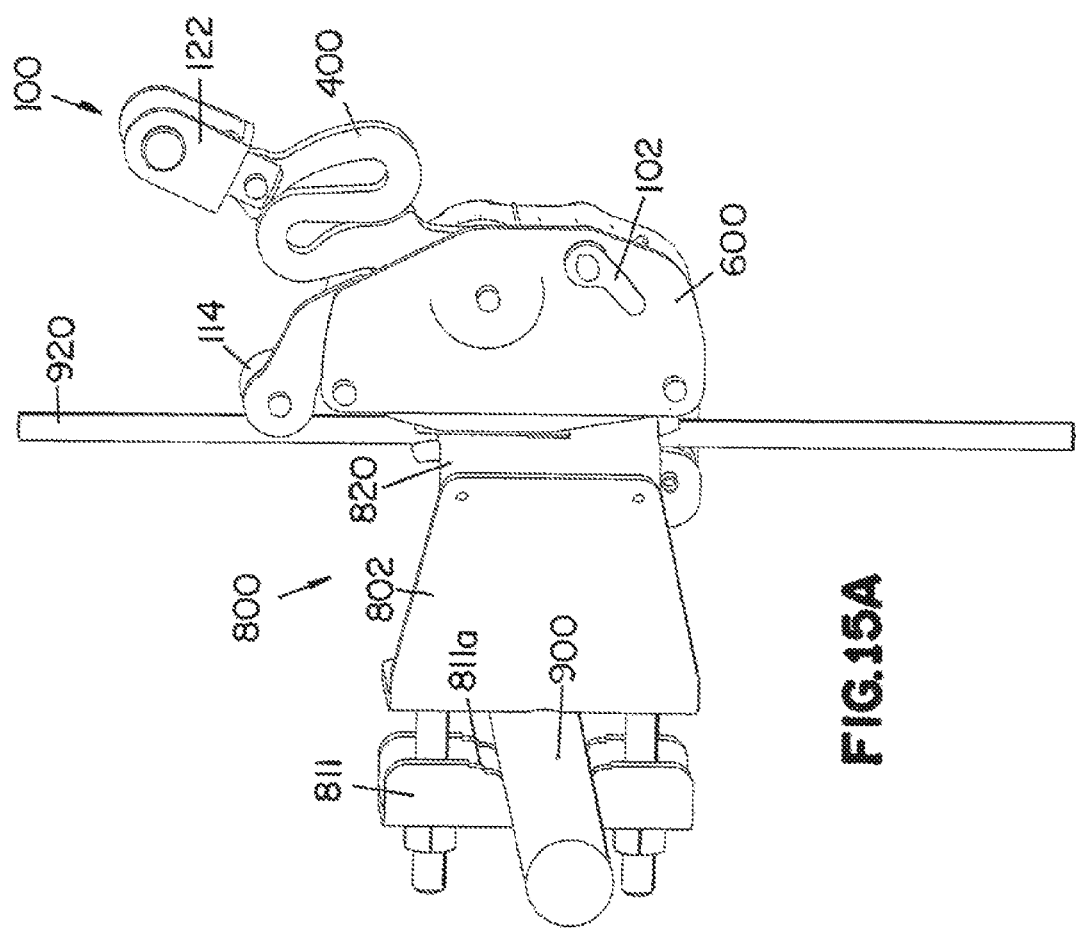

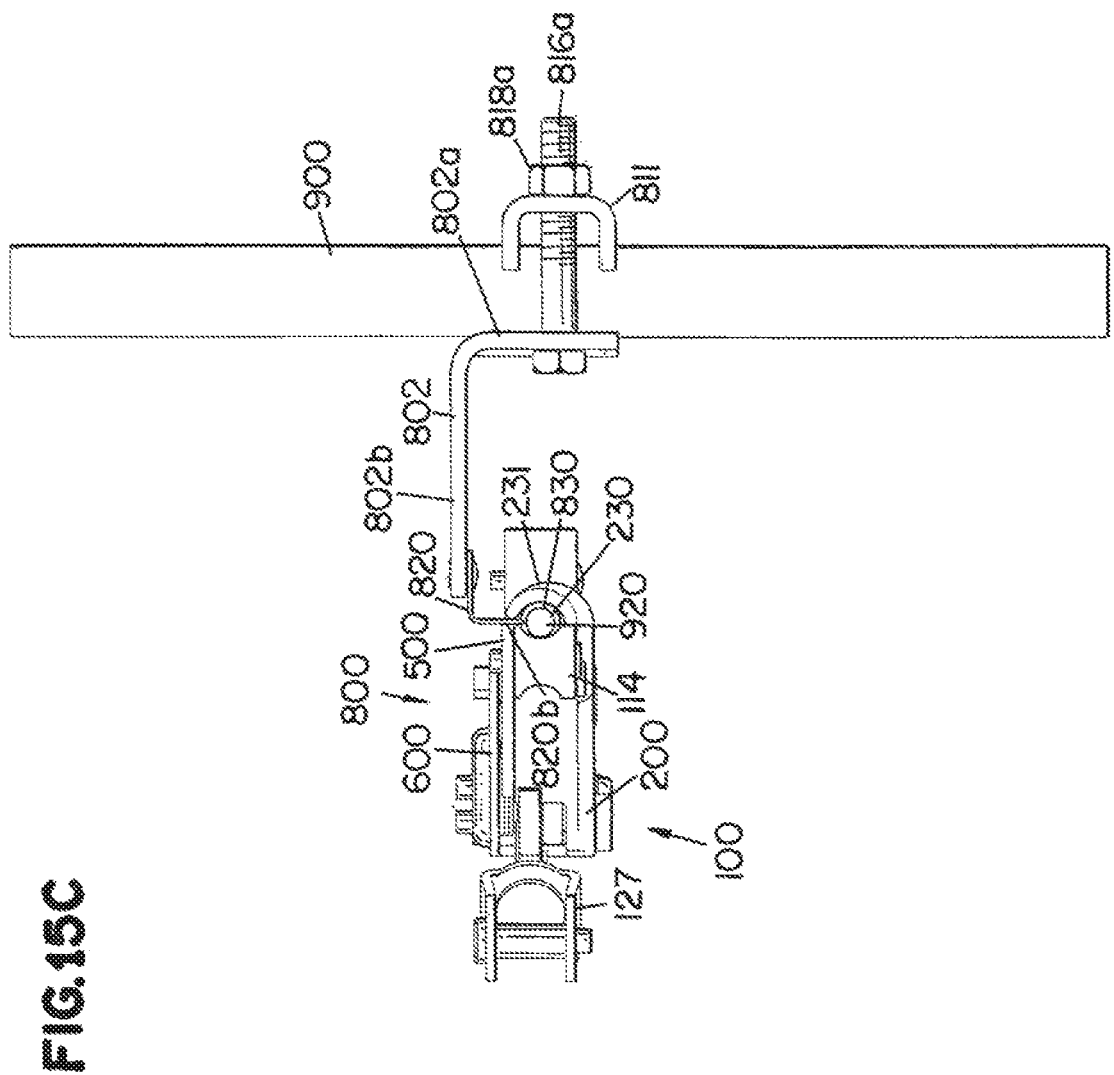

ROPE GRAB

This application claims priority to and is a Continuation of U.S. patent application Ser. No. 13/551,845 filed on Jul. 18, 2012, now U.S. Pat. No. 9,132,297 issued on Sep. 15, 2015, entitled ROPE GRAB, which is hereby incorporated by reference.

BACKGROUND

Regulations typically require workers who work at heights to don a safety harness that is coupled to a support structure so that if a fall event occurs, the fall is limited, therein reducing the chances of injuries to the worker. Systems that protect workers during fall events that can occur while climbing or descending on structures such as ladders and the like can be a challenge because of the varying vertical locations of the worker in relation to a support structure.

For the reasons stated above and for other reasons stated below which will become apparent to those skilled in the art upon reading and understanding the present specification, there is a need in the art for an effective and efficient rope grab system that includes a rope grab and a generally vertically placed elongated member that is used as a support structure.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a rope grab is provided. The rope grab includes a housing, a locking cam, a cam spring and a locking arm. The housing has an elongated member guide forming an elongated member passage. The elongated member passage is configured and arranged to receive an elongated member. The locking cam is pivotally coupled to the housing. The locking cam is configured and arranged to selectively engage an elongated member received in the elongated member passage. The cam spring is coupled between the housing and the locking cam to provide a relatively slight biasing force on the locking cam towards an elongated member received in the elongated member passage. The locking arm is pivotally coupled to the housing. The locking arm has a first end that is configured and arranged to be coupled to a safety harness of a user and a second end that is configured and arranged to selectively engage the locking cam to lock the locking cam on an elongated member in the elongated member passage during a fall event.

In another embodiment, another rope grab is provided. The rope grab of this embodiment includes a housing, a locking cam and a locking arm. The housing has an elongated member guide that forms an elongated member passage. The elongated member passage is configured and arranged to receive an elongated member. The locking cam is pivotally coupled to the housing. The locking cam is configured and arranged to selectively engage an elongated member received in the elongated member passage. The locking cam has a radial edge that is configured and arranged to engage the elongated member. The radial edge having a curvature that varies in relation to a pivot connection to the housing so that the radial edge engages each elongated member at a contact angle that is the same even when different diameter elongated members are received in the elongated member passage of the housing. The locking arm is pivotally coupled to the housing. The locking arm has a first end that is configured and arranged to be coupled to a safety harness of a user and a second end that is configured and arranged to selectively engage the locking cam to lock the locking cam on an elongated member during a fall event.

In still another embodiment, yet another rope grab is provided. The rope grab includes a housing, a locking cam, a cam spring, a locking arm, a rotating side plate, a roller and a fixed side plate. The housing has an elongated member guide that forms an elongated member passage. The elongated member passage is configured and arranged to receive an elongated member. The locking cam is pivotally coupled to the housing. The locking cam is configured and arranged to selectively engage an elongated member received in the elongated member passage. The cam spring is coupled between the housing and the locking cam to provide a relatively slight biasing force on the locking cam in a direction towards an elongated member received in the elongated member passage. The locking arm is pivotally coupled to the housing. The locking arm has a first end that is configured and arranged to be coupled to a safety harness of a user and a second end that is configured and arranged to selectively engage the locking cam to lock the locking cam on the elongated member during a fall event. The rotating side plate is pivotally coupled to the housing to selectively block a side opening to the elongated member passage of the housing. The roller is coupled to the rotating side plate proximate an end of the rotating side plate. The roller is configured to guide an elongated member through the elongated member passage. The fixed side plate is coupled to the housing. Moreover, the locking cam, the locking arm and the rotating side plate are positioned between the fixed side plate and the housing.

In still further another embodiment, a method of manipulating a rope grab is provided. The method includes rotating a lever rotationally coupled to a housing to release a rotating side plate with a hand of a user; pulling back on an end of the rotating side plate to pivot a portion of the rotating side plate away from a side opening to an elongated member passage formed in the housing with the hand of the user; positioning the rope grab to receive an elongated member within the elongated member passage of the housing with the hand of the user; and releasing the rotating side plate to allow the rotating side plate to at least partially cover the side opening to the elongated member passage of the housing to retain the elongated member with the elongated member passage.

BRIEF DESCRIPTION OF THE DRAWINGS

The present invention can be more easily understood and further advantages and uses thereof will be more readily apparent, when considered in view of the detailed description and the following figures in which:

FIG. 3A is a first side view of a housing of the rope grab of FIG. 1 of one embodiment of the present invention;

FIG. 3B is a cross-sectional front view of the housing along line 3B-3B of FIG. 3A;

FIG. 3C is a second side view of a housing of the rope grab of FIG. 1;

FIG. 3D is a top view of the housing of the rope grab of FIG. 1;

FIG. 4A is a side view of a fixed side plate of one embodiment of the rope grab of FIG. 1;

FIG. 4B is a front view of the fixed side plate of FIG. 4A;

FIG. 5A is a side view of a rotating side plate of one embodiment of the rope grab of FIG. 1;

FIG. 5B is a front view of the rotating side plate of FIG. 5A;

FIG. 6A is a side perspective view of an arm spring of one embodiment of the rope grab of FIG. 1;

FIG. 6B is a side view of the arm spring of FIG. 6A;

FIG. 6C is a top view of the arm spring of FIG. 6A;

FIG. 7A is a side perspective view of a spring spacer of one embodiment of the rope grab of FIG. 1;

FIG. 7B is a side view of the spring spacer of FIG. 7A;

FIG. 7C is a cross-sectional front view of the spring spacer along line 7C of FIG. 7B;

FIG. 8A is a side perspective view of a first lever of one embodiment of the rope grab of FIG. 1;

FIG. 8B is a front view of the first lever of FIG. 8A;

FIG. 9A is a side perspective view of a locking member of one embodiment of the rope grab of FIG. 1;

FIG. 9B is a first side view of the locking member of FIG. 9A;

FIG. 9C is a second side view of the locking member of FIG. 9A;

FIG. 10A is a side view of a locking arm of one embodiment of the rope grab of FIG. 1 with the rotating side plate in a locked position;

FIG. 10B is a side view of the locking arm of FIG. 10A with the rotating side plate in an unlocked position;

FIG. 11A is a side perspective view of a locking cam of one embodiment of the rope grab of FIG. 1;

FIG. 11B is another side perspective view of the locking cam of FIG. 11A;

FIG. 11C is a side view of the locking cam of FIG. 11A;

FIG. 11D is a second side view of the locking cam of FIG. 11A;

FIG. 11E is a front view of the locking cam of FIG. 11A;

FIG. 12A is a cross-sectional side view of a partial rope grab of FIG. 1 engaging a first elongated member of a first diameter;

FIG. 12B is another cross-sectional side view of a partial rope grab of FIG. 1 engaging a second elongated member of a second diameter;

FIG. 14A is a side perspective view of an assembled bypass bracket of one embodiment of the present invention;

FIG. 14B is a side unassembled view of the bypass bracket of FIG. 14A;

FIG. 15A is a side perspective view of a bypass bracket of an embodiment of the present invention coupled to a support structure and a rope grab;

FIG. 15B is a side perspective view of the bypass bracket of FIG. 15A; and

FIG. 15C is a top view of the bypass bracket of FIG. 15A coupled to the support structure.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
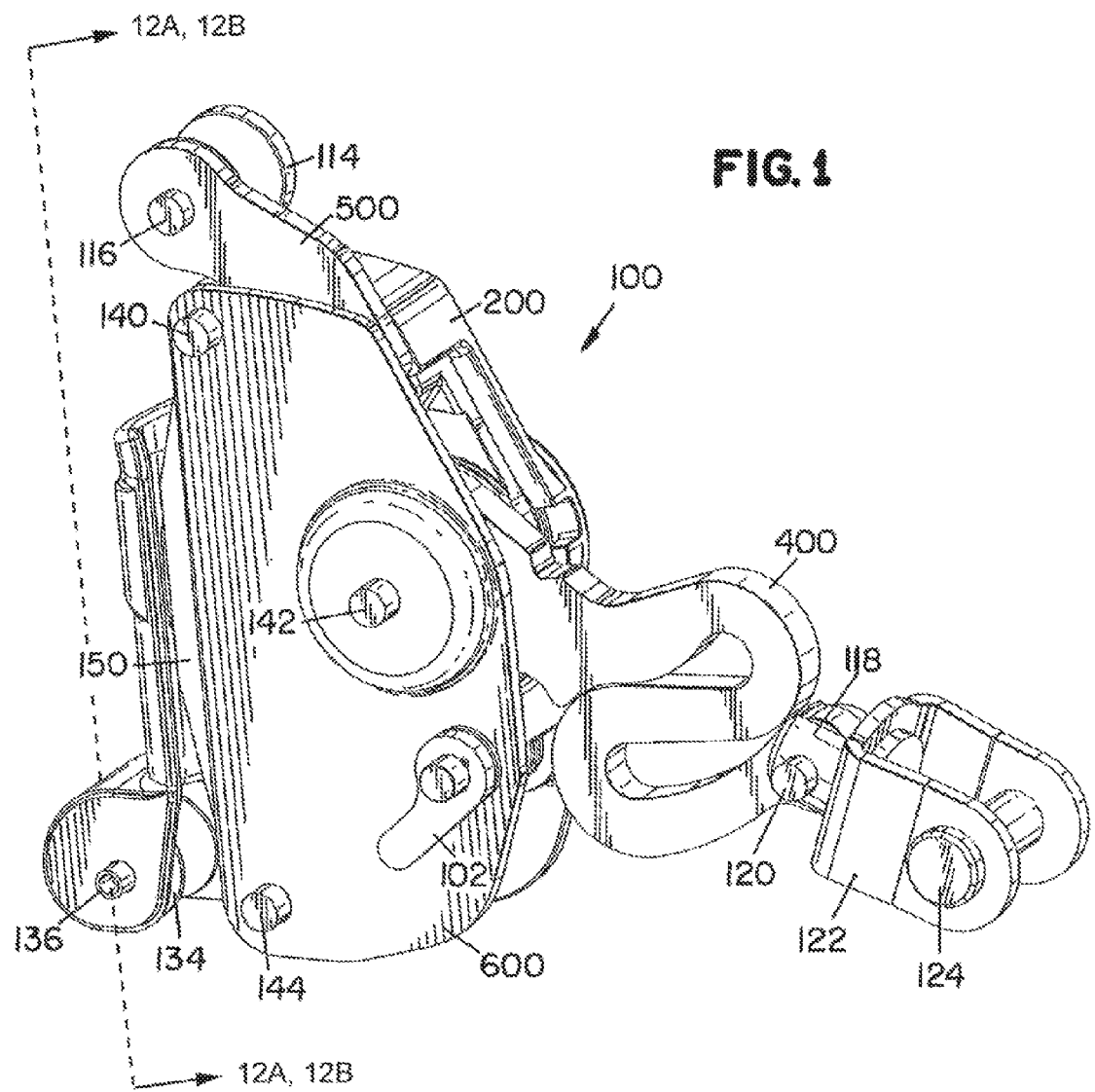
FIG. 1 is a side perspective view of a rope grab of one embodiment of the present invention.

Embodiments of the present invention provide a rope grab 100 used for fall protection that can be easily manipulated with one hand to attach and detach the rope grab 100 from an elongated member such as a rope or cable used as a support structure. The rope grab 100 is designed to be coupled to a safety harness donned by a user. The rope grab 100 is designed to lock onto the elongated member during a fall event to limit the fall of the user. An embodiment of the rope grab 100 is illustrated in the side perspective view of FIG. 1 and the exploded view of the rope grab 100 in FIG. 2. The rope grab 100 includes a housing 200, a locking cam 300, a locking arm 400, a rotating side plate 500, and a fixed side plate 600. The locking cam 300, the locking arm 400 and the rotating side plate 500 are pivotally coupled to the housing 200 as further discussed below. The elements of the rope grab 100 are first described and then the construction and operation of the rope grab 100 are described.

The housing 200 of the rope grab 100 is further illustrated in FIGS. 3A through 3D. The housing 200 includes a body 202 that has a first side 303a and a second side 303b. The body 202 further has an upper end 202a and an opposed lower end 202b. Proximate the upper end 202a of the body 200 is positioned an upper end wall portion 201a that extends generally perpendicular from the first side 303a of the body 202. Proximate the lower end 202b of the body 202 is positioned a lower end wall portion 201b that extends generally perpendicular from the first side 303a of the body 202. The body 202 further has a first side edge 202c and an opposed second side edge 202d. Proximate the first side edge 202c of the housing 200 is a cable guide 231 that extends from the first side 303a of the body 202 in generally a C shape. The cable guide 231 forms a cable guide passage 230 (or elongated member passage) that extends from proximate the upper end 202a to the lower end 202b of the body 202. Proximate the lower end 202b of the body 202 of the housing 200 and proximate the first side 202c of the body 202 of the housing 200 is positioned a lower roller rivet passage 240 that passes through the body 202. Moreover, a central post 204 extends generally perpendicular from the first side 303a of the body 202. The central post 204 is generally located at a mid portion between the upper end 202a and the lower end 202b of the body 202 towards the second side edge 202d of the body 202 of the housing 200. The central post 204 includes a first central post portion 204a, a second central post portion 204b and third central post portion 204c. The first central post portion extends from the first side 303a of the body 202. The second central post portion 204b extends from the first central post portion 204a and has a diameter that is less than a diameter of the first central post portion 204a. The third central post portion 204c extends from the second central post portion 204b and has a diameter that is less than the diameter of the second central post portion 204b. A central post passage 206 passes through the central post 204. Surrounding the central post 204 is a cam spring holding channel 218 that is formed in the first side 303a of the body 202. The cam holding channel 218 includes a circular portion 218a and an extending leg portion 218b. In the embodiment shown, the leg portion 218b terminates in a spring retaining aperture 218c.

A lever passage 212 passes through the body 202 of the housing 200 proximate the second side edge 202d and towards the lower end 202b of the body 202. The lever passage 212 is further positioned proximate the central post 204. The lever passage 212 includes a circular portion 212a and an extending portion 212b that extends from the circular portion 212a towards the lower end 202b of the body 202 of the housing 200. Proximate the lever passage 212 is a side wall portion 214 that extends generally perpendicular from the first side 303a of the body 202 of the housing 200. The side wall portion 214 is further generally positioned between the central post 204 and the lever passage 212. Proximate the side wall portion 214 is a mid wall portion 216 that also generally extends perpendicular from the first side 303a of the body 202 of the housing 200. The mid wall portion 216 is also positioned proximate the lever passage 212. Further, a raised portion 215 extends from the first side 303a of the body 202 of the housing 200. The raised portion 215 extends from the first side 303a of the body 202 around the lever passage 212. The height of the raised portion 215 is less than a height of the side wall portion 214 and a height of the mid wall portion 216. The housing 200 further includes a lower post 208 that is positioned proximate the lower end 202b of the body 202 of the housing 200. The lower post 208 extends from the first side 303a of the body 202 and includes a central lower post passage 210. In particular, the lower post 208 includes a first lower post portion 208a that extends from the first side 303a of the body 202 and a second lower post portion 208b that extends from the first lower post portion 208a. The second lower post portion 208b has a diameter that is less than a diameter of the first lower post portion 208a. The housing 200 also has an upper post 221 that extends from the first side 303a of the body 202. The upper post 221 is positioned proximate the upper end 202a of the body 202 and includes an upper post passage 220. As illustrated in FIG. 3C, a lever spring holding channel 211 is formed in the second side 303b of the body 202 of the housing 200 around a portion of the lever passage 212. Also illustrated in FIG. 3C is a lever stop 231 that extends from the second side 303b of the body 202 of the housing 200 proximate the lever passage 212. The lever stop 231 is designed to stop rotation of lever 700 at a select orientation.

The fixed side plate 600 is illustrated in FIGS. 4A and 4B. The fixed side plate includes an upper end 612 and an opposed lower end 614. The fixed side plate 600 further includes a first edge 616 and an opposed second edge 618. The fixed side plate 600 further includes a first side 602a and a second side 602b. A first connecting passage 606 passes through the fixed side plate 600 proximate the upper end 612 and the first edge 616. A second connection passage 608 passes through the fixed side plate 600 proximate the first edge 616 and the lower end 614. The fixed side plate 600 further includes a third connection passage 604 which is positioned generally at a mid portion of the fixed side plate 600 and towards the second edge 618. As illustrated in FIGS. 4A and 4B, a spring spacer bulge 602c extends from the first side 602a of the fixed side plate 600 creating a depression in the second side 602b of the fixed side plate 600 to receive an end of the spring spacer 112 as discussed further below. The third connection passage 604 is centrally located within the spring bulge 602c of the fixed side plates 600. The fixed side plate 600 also includes a lever passage 610 that is positioned proximate the second edge 618 of the fixed side plate 600 and between the third connection passage 604 and the lower end 614 of the fixed side plate 600. As illustrated in FIG. 4A, the second side edge 614, in this embodiment, has several edge extending portions that extend at select angles from each other so that the second side edge 614 conforms to the general shape of the second side edge 202d of the housing 200.

Referring to FIGS. 5A and 5B, a rotating side plate 500 of one embodiment is illustrated. The rotating side plate 500 includes a first edge 508 an opposed second edge 510. The rotating side plate 500 also includes an upper end 506 and an opposed lower end 504. The first edge 508 includes a plurality of edge portions 508a, 508b, 508c and 508d. In particular, the first portion 508a extends from the lower end 504 to the second portion 508b. The second portion 508b extends from the first portion 508a at a select angle. A third portion 508c extends from the second portion 508b at a select angle. The first, second and third portions 508a, 508b and 508c form a portion of the rotating side plate 500 that selectively blocks access to the cable guide passage 230 of the housing 200 as discussed further below. A fourth portion 508b extends from the third portion 508c to the upper end 506. The fourth portion 508d is generally curved forming generally a cutout section in the rotating side plate 500 that is designed to selectively receive the upper post 221 of the housing 200 when assembled. The second side edge 510 also has a plurality of edge portions 510a, 510b, 510c, 510d, 510e, 510f and 510g. In particular a first portion 510a extends from the lower end 504. A second portion 510b extends from the first portion 510a. A third portion 510c extends from the second portion 510b. A fourth portion 510d extends from the third portion 510c and a fifth portion 510e extends from the fourth portion 510d. As illustrated in FIG. 5A the third portion 510c, fourth portion 510d and the fifth portion 510e form a cutout section in the second edge 510 of the rotating side plate 500 that allows for movement of the rotating side plate 500 in relation to the spring spacer 112 when the rope grab 100 is assembled. The sixth portion 510f extends from the fifth portion 510e at a select angle. The seventh portion 510g extends between the sixth portion 510f and the upper end 506. The rotating side plate 500 further includes a first side surface 502a and a second side surface 502b. Proximate the lower end 504 and extending in a direction of the second side surface 502b of the rotating side plate is an extending tab 502c. The rotating side plate 500 further includes a pivot connection passage 512 positioned proximate the lower end 504 and a roller connection passage 514 positioned proximate the upper end 506.

FIGS. 6A through 6C illustrate an arm spring 110 of one embodiment. The arm spring 110 includes a central coiled portion 110a. The coiled portion 110a is positioned between a first end portion 110b and a second end portion 110c. The first end portion 110b extends inward in relation to the coiled portion 110a. The second end portion 110c extends in a direction away from the first end portion 110b and terminates in a bent holding end 111. The second end portion 110c of the arm spring 110 is shaped to engage an arm spring groove 409 of the locking arm 400 as discussed further below. FIGS. 7A through 7C illustrate a spring spacer 112 of one embodiment of the present invention. The spring spacer 112 includes generally a cylindrical body 112a having a first end 113 and an opposed second end 114. The body 112a of the spring spacer 112 further includes a central passage 115. In addition, a spring holding slot 112b is formed in the first end 113 of the spring spacer 112. The spring holding slot 112*b* extends across the first end 113 of the spring spacer 112 such that it extends into a portion of the central passage 115. Moreover, the spring holding slot 112*b* is designed to receive the first end portion 110*b* of the arm spring 110 while the coiled portion 110*a* of the arm spring 110 is positioned around the cylindrical body 112*a* of the spring spacer 112. The spring spacer 112 further includes a bore 112*c* extending into the first end 113 of the cylindrical body 112*a*. The bore is used by tool to put a required pre-wind on the arm spring 110 during assembly.

FIGS. 8A through 8B illustrate a first lever 700 of one embodiment of the present invention. The first lever 700 includes a stem 702 and an activation knob 704. The stem 702 includes a first stem portion 702*a* and a second stem portion 702*b*. The first stem portion 702*a* extends between the activation knob 704 and the second stem portion 702*b*. The second stem portion 702*b* has a diameter that is less than the diameter of the first stem portion 702*a*. An engaging tab 710 centrally extends from a surface of the first stem portion 702*a*. A pair of rotating locking tabs 708*a* and 708*b* opposably extend from a surface of the second stem portion 702*b* proximate the first stem portion 702*a*. The activation knob 704 includes a first disk portion 704*a* which is coupled to an end of the first stem portion 702*a* and a second extending portion 704*b* which extends away from the first disk portion 704*a* in a select direction. The second extending portion 704*b* provides leverage to rotate the stem 702. The activation knob 704 further has a third extending portion 704*c* that extends from the second extending portion 704*b* towards the stem portion 702. The third extending portion 704*c* is designed to selectively engage the lever stop 231 on the second side 303*b* of the housing 200 when assembled. FIGS. 9A through 9C illustrate a lock member 106 of one embodiment. The lock member 106 includes a cylindrical base member 106*a* and an extending portion 106*d* that extends away from the cylindrical base member 106*a* proximate an end of the cylindrical base member 106*a*. The lock member 106 has a first side 107 an opposed second side 109. The cylindrical base member 106*a* includes a lock member passage 106*c* and a cutout section 106*b* that is positioned proximate the first side 107 of the lock member 106. Extending portion 106*d* includes a lock spring holding channel 106*e* that is formed in the second side 109 of the locking member 106. The lock spring holding channel 106*e* extends across the width of the extending portion 106*d*. The extending portion 106*d* further includes a lock spring holding slot 106*f* in a side of the extending portion 106*d* that extends a height of the extending portion 106*d*. The lock spring holding slot 106*f* extends into the lock spring holding channel 106*e*.

Figure 2:
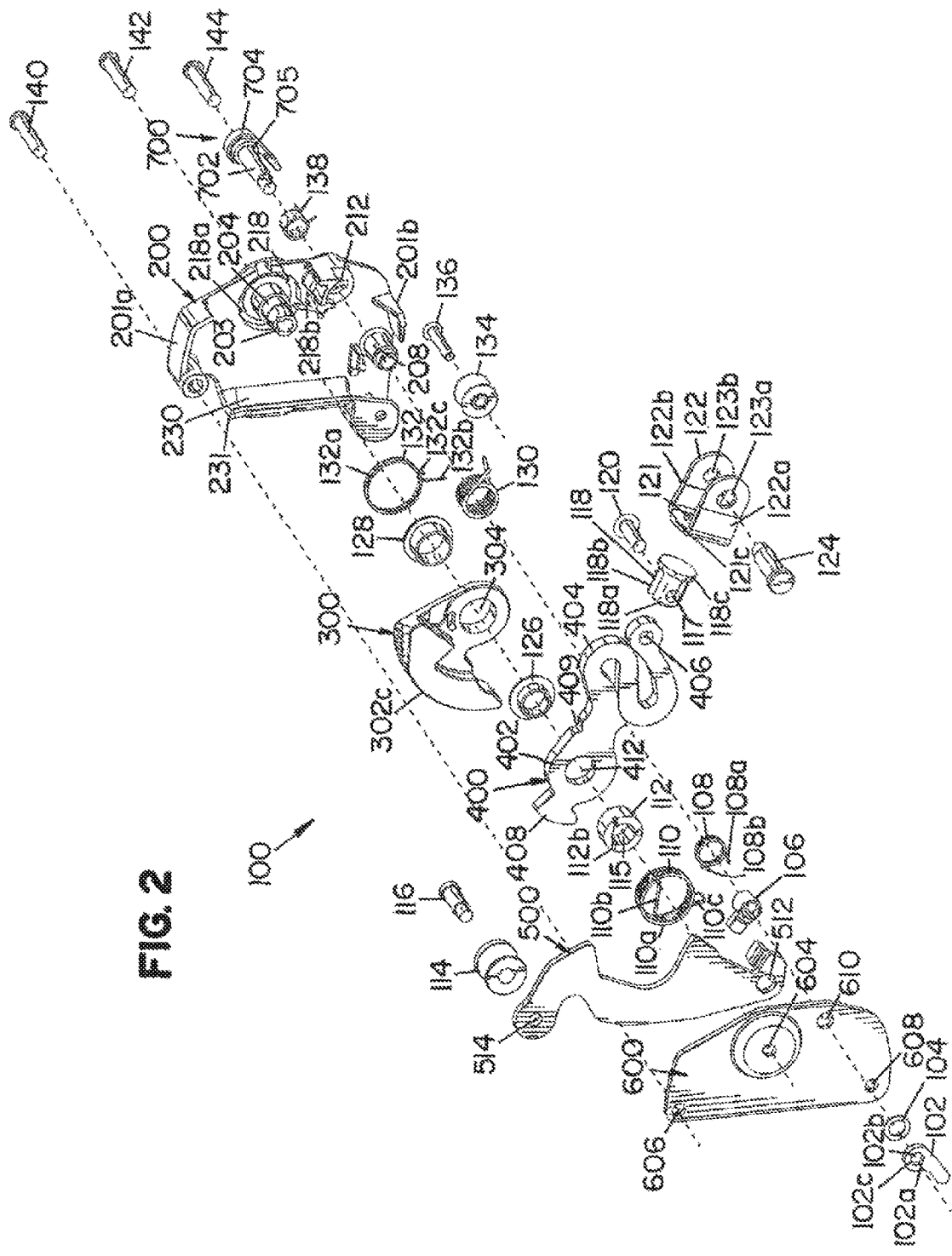
FIG. 2 is an unassembled view of the rope grab of FIG. 1.

Illustrations of the locking arm 400 are provided at least in FIGS. 2, 10A and 10B. The locking arm 400 includes a locking arm main portion 402 and a locking arm energy absorber portion 404. The locking arm main portion 402 includes a main locking arm passage 412. In addition, a locking arm extending portion 408 extends from the locking arm main portion 402 in a direction that is opposite a direction that the locking arm energy absorber portion 404 extends from the locking arm main portion 402. An arm spring groove 409 is formed in an edge proximate a junction between the locking arm main portion 402 and the locking arm energy absorber 404. The locking arm energy absorber portion 404 includes an energy absorber connector passage 406 proximate a termination end of the locking arm energy absorber portion 404. The energy absorber connection passage 406 is used to connect a safety harness (not shown) donned by a user to the rope grab 100 as further discussed below. For example, in a typical application a frontal D-ring of a safety harness would be coupled to the swivel connector 122 attached to the energy absorber portion 404 of the locking arm 400 via carabiner (not shown). During a fall event, the locking arm energy absorber portion 404 is designed to straighten out therein absorbing energy to prevent injuries to the user.

Referring to FIGS. 11A through 11E one embodiment of a locking cam 300 is illustrated. The locking cam 300 includes a cam body 302. The cam body 302 of the locking cam 300 includes a connection portion 302*a* and an engagement portion 302*b*. The cam body 302 further includes a first side 301*a* and a second side 301*b*. The connection portion 302*a* of the cam body 302 includes a cam passage 304. Proximate the cam passage 304 in the connection portion 302*a* of the locking cam 300 is a cam spring holding portion 306 which includes a cam spring passage 306*b* which extends through the locking cam 300 and a cam spring slot 306*a* which is formed in the first side 301*a* of the cam body 302. The cam spring slot 306*a* leads to the cam spring passage 306*b*. In use, a portion of a cam spring 132 illustrated in FIG. 2 is received in the cam whole spring holding portion 306 as further described below. The first side 301*a* of the cam body 302 further includes a recessed portion 312 that is positioned proximate the cam spring holding portion 306 and extending to an edge of the cam body 302. The recessed portion 312 provides room for movement of the holding end 111 of the second end portion 110*c* of the arm spring 110 engaging the locking arm 400 when the rope grab is assembled. The engaging portion 302*b* of the locking cam 300 extends from the connection portion 302*a*. The width of the engaging portion 302*b* is greater than the width of the connection portion 302*a*. In particular, the width of the engaging portion 302*b* extends wider than the width of the connection portion 302*a* in the direction of the first side 301*a* of the cam body 302. The engaging portion 302*b* of the locking cam 300 further terminates in a radial edge 302*c*. The radial edge 302*c* extends generally radially about cam passage 304 with a varied radial configuration as described below. The radial edge 302*c* has generally a concave surface with a plurality of extending gripping tabs 310 that are designed to frictionally engage an elongated member.

The engaging portion 302*b* of the locking cam 300 further includes a first side edge 320 and a second side edge 321 that respectively extend from the connection portion 302*a* to the radial edge 302*c*. The second side edge 321 extends generally in a straight line from the connection portion 302*a* to the radial edge 302*c*. The first side edge 320 has a plurality of first side edge portions 320*a*, 320*b* and 320*c*. The first side edge portion 320*a* extends from the connection portion 302*a* in generally a perpendicular fashion. The second side edge portion 320*b* extends from the first side edge portion 320*a* in generally a curved configuration. The third side edge portions 320*c* extends from the second side edge portion 320*b* in generally a straight line to the radial edge 302*c*. The locking cam 300 further includes a hub portion 303 that extends around the cam passage 304 of the connection portion 302*a* of the cam body 302. The hub 303 extends out from the second side 301*b* of the cam body 302. The engaging portion 302*b* of the locking cam 300 further includes a third edge 330 that defines the engaging portion 302*b* from the connection portion 302*a*. The third edge 330 includes a locking arm engaging surface 332. The extending portion 408 of the locking arm 400 engages the locking arm engaging surface 332 of the locking cam 300 during a fall event as the locking arm 400 as further discussed below.

The construction of the rope grab 100 is further described in view of FIG. 2 and the Figures described above. A cam spring 132 having a coiled section 132a and a first end 132b is received in the cam spring holding channel 218 of the body 202 of the housing 200. In particular, the coiled section 132a of the cam spring 132 is received in the circular portion 218a of the cam spring holding channel 218 and the first end 132b of the cam spring 132 is received in the leg portion 218b of the cam spring holding channel 218. This configuration retains a first end of the cam spring 132 in a static configuration in relation to the housing 200. A first bearing 128 is positioned within the cam passage 304 of the locking cam 300. The cam passage 304 is then positioned around the first post portion 204a of the central post 204 of the housing 200. A second end 132c of the cam spring 132 is passed through the cam spring passage 306b and received in the cam spring slot 306a of the cam spring holding portion 306 of the locking cam 300. This arrangement of the cam spring 132 provides a relatively light biasing force on the locking cam 300 to rotate the locking cam 300 towards an elongated member in the elongated member passage 230 of the housing 200. This relatively light biasing force is countered by gravity in normal climbing operations which keeps the cam lock 300 from locking onto the elongated member. Hence during normal operations, the rope grab 100 moves relatively freely up and down the elongated member. In a free fall (fall event), gravitational forces do not counteract the light biasing force of the cam spring 132 and the locking cam 300 will lock onto the elongated member. Inertial loads on the locking cam 300 during a fall also work in tandem with the light biasing force of the cam spring 132 to rotate the locking cam 300 onto the elongated member.

A second bearing 126 is positioned in the main locking arm passage 412 of the locking arm 400. The main locking passage 412 of the locking arm is then positioned around the second post portion 204b of the central post 204 of the housing 200. The spring spacer 112 is then positioned around the third post portion 204c of the central post 204. The coiled portion 110a of the arm spring 110 is positioned around the spring spacer 112 while the first end portion 110b of the arm spring 110 is received in the spring holding slot 112b of the spring spacer 112. The first end portion 110b of the arm spring 110 is further received in the cut out section 203 of the third post portion 204c of the post 204 of the housing 200. This arrangement holds the first end portion 110b of the arm spring 110 in a static position in relation to the housing 200. The second end portion 110c of the arm spring 110 is received in the arm spring groove 409 of the locking arm 400 to assert a biasing force on the locking arm 400 in a locked position. A fastener, such as rivet 142 passing through the central post passage 206 of the central post 204 of the housing 200 and the third connector passage 604 of the fixed side plate 600 couples the housing 200 to the fixed side plate 600.

A lever spring 138 is positioned over the stem 702 of the first lever 700. The stem 702 of the first lever 700 is in turn passed through the lever passage 212 of the housing 200. A first end portion 138a of the lever spring 138 is received in a spring holding bore 705 in the first lever 702. A second end portion 138b of the lever spring 138 is positioned in a gap in the second side edge 214 of the housing 200 so that a biasing force is exerted on the stem 702 of the first lever 700 in a desired direction. The extending portion 212b of the lever passage 212 allows the engaging tab 710 extending from the stem 702 of the first lever 700 to pass through the lever passage 212. Once the stem 702 is passed through the lever passage 212 of the housing 200, the lock spring 108 is positioned around the stem 702. A first end portion 108a of the lock spring 108 engages a portion of the second side wall 214 of the housing 200 to hold the first end portion 108a of the lock spring 108 in a static location in relation to the housing 200. The stem 702 of the first lever 700 is then passed through the lock member passage 106c of the lock member 106. The engaging tab 710 of the stem 702 of the first lever 700 is received in the cut out section 106b of the lock member 106 to lock the rotation of the stem 702 with the rotation of the lock member 106. A second end portion 108b of the lock spring 108 is received in the lock spring holding channel 106e of the extending portion 106d of the lock member 106 to exert a biasing force on the lock member 106 in a desired direction. The stem 702 is then further passed through the lever passage 610 in the fixed side plate 600. A washer 104 and a second lever 102 are then coupled on the second stem portion 702b of the stem 702. The second lever 102 includes a stem connection passage 102c with opposed grooves 102a and 102b. The opposed grooves 102a and 102b respectfully receive the rotation locking tabs 708a and 708b of the stem 702 of the first lever 700 to lock rotation of the second lever 102 to the rotation of the stem 702.

A first fastener 140 (first rivet) passing through the upper post passage 220 of the upper post 221 of the housing 200 and through the first connection passage 606 in the fixed side plate 600 and a second fastener 144 (second rivet) passing through the lower post passage 210 of the lower post 208 of the housing 200 and through the second connection passage 608 in the fixed side plate 600 further couples the housing 200 to the fixed side plate 600. The second fastener 144 further passes through the pivot connection passage 512 of the rotating side plate 500 to provide a pivot connection for the rotating side plate 500. The rope grab 100 further includes an upper roller 114 and a lower roller 134 to guide the elongated member through the cable guide channel 230 of the housing 200. The upper roller 114 is rotationally coupled to the rotating side plate 500 via upper roller rivet 116. The lower roller 134 is rotationally coupled to the housing 200 adjacent the cable guide 231 of the housing 200 via lower rivet 136.

A lifeline swivel connector 122 is coupled to the energy absorbing portion 404 of the locking arm 400 via swivel pivot connector 118. In particular, the swivel lifeline connector 122 includes a base 121c with a connection passage 121 and a pair of spaced arms 122a and 122b with aligned passages 123a and 123b. A pair of spaced arms 118a and 118b of a swivel pivot connection 118 is passed through the connection passage 121 of the swivel lifeline connector 122. A head portion 118c of the swivel pivot connection 118 has a diameter larger than the diameter of the connection passage 121 of the swivel lifeline connector 122. The pair of spaced arms 118a and 118b have aligned swivel pivot connection passages 117. A rivet 120 passes through the aligned swivel pivot connection passages 117 and the connection passage 406 of the locking arm 400 to couple the swivel lifeline connector 122 to the locking arm 400. A rivet 124 passed through the aligned passages 123a and 123b of the swivel lifeline connector 122 is used to couple a lifeline to the rope grab 100. As discussed above, the lifeline would be coupled to a safety harness (not shown) donned by a user.

Referring to the partial views of the rope grab 100 in FIGS. 10A and 10B the operation of the rope grab 100 is discussed. FIG. 10A illustrates the rotating side plate 500 in a retaining configuration in which a portion of the rotating side plate 500 proximate the first edge 508 of the rotating side plate 500 covers at least a portion of the side opening 150 to the cable guide passage 230. In this configuration, an elongated member (not shown in FIG. 10A) is retained in the cable guide passage 230 of the cable guide 231 of the housing 200. The retaining configuration is achieved when the extending portion 106d of the lock member 106 engages the second edge portion 510b of the second edge 510 of the rotating side plate 500 which retains the rotating side plate 500 in a static location in relation to the cable guide 231. The lock spring 108 biases the lock member 106 in this configuration. FIG. 10B illustrates the rotating side plate 500 in an open configuration. In this configuration, a portion of the rotating side plate 500 proximate the first edge 508 of the rotating side plate 500 is moved far enough away from the cable guide 231 to allow passage of an elongated member into and out of the cable guide passage 230 through the side opening 150 to the cable guide passage 230. To get the rotating side plate 500 into this configuration, at least one of the first and second levers 700 and 102 is rotated, which rotates the extending portion 106d of the lock member 106 away from the second edge portion 510b of the second edge 510 of the rotating side plate 500. The biasing force from the side plate spring 130 engaging the extending tab 502c biases the rotating side plate 500 to the retaining configuration. Hence, the rotating side plate 500 must be rotated by hand after at least one of the levers 700 or 102 is rotated. This is done by pulling back on the rotating side plate 500 proximate the upper roller 114. The rope grab 100 is designed so that a user can both rotate one of the levers 700 or 102 and pull back on the rotating side plate 500 to put the rotating side plate in the open configuration with a single hand. Once in the open position, an elongated member can be slid into or out of the cable passage 230. Once the elongated member is positioned in or taken out of the cable passage 230, the rotating side plate 500 can be released to rotate the rotating side plate 500 to the retaining position and the lever 700 or 102 can be released to engage the lock member 106 to the rotating side plate 500.

The partial cross-sectional side views of the rope grab 100 of FIGS. 12A and 12B illustrate the rope grab 100 engaging two different elongated members 702 and 714 respectfully. As discussed above, the elongated member 702 and 714 may be a rope, a cable or any type of elongated member that can be used as a safety support member. One of the features of embodiments of the present invention is that the elongated members 702 and 714 may have different diameters, as illustrated in FIGS. 12A and 12B, but will have the same contact angle 720 (Alpha 1 and Alpha 2). That is, the curvature of the radial edge 302c of the locking cam 300 is not constant in relation to the central post passage 206. The curvature varies so that the same contact angle 720 between the radial edge 320c of the locking cam 300 and the cable guide 231 of the housing is achieved for a range of diameters of the elongated members. The contact angle 720 is an angle that provides sufficient holding friction of the rope grab 100 between the radial edge 302c of the locking cam 300 and the cable guide 231 during a fall event. This is further discussed below.

The partial cross-sectional views in FIGS. 12A and 12B illustrate the rope grab 100 in use after the elongated member 702 or 714 has been positioned within the cable guide passage 230 of the housing 200. As illustrated, the elongated members 702 or 714 are guided through the cable guide passage 230 formed by the cable guide 231 with the upper roller 114 and the lower roller 134. During normal use when the user is climbing or descending, the locking cam rotates to the open position under the influence of gravity, so a minimal (if any) frictional force is applied to the elongated member via the rope grab 100. Hence, the rope grab 100, in a normal non-fall event use, is relatively free to move up and down on the elongated member with the movement of the user who would be coupled to the locking arm via carabiner or other connecting means and safety harness (not shown). FIGS. 12A and 12B illustrate that in this embodiment during normal use, a portion of the mid side wall portion 116 of the body 202 of the housing 200 rests in the locking arm engaging groove 410 of the locking arm 400.

During a fall event, a user's frontal attachment to the user's harness that is coupled to the swivel connector 122 (which is in turn coupled to the locking arm 400) will pull the locking arm 400 down, therein rotating locking arm 400 about the central post 204. This movement causes the extending portion 408 of the locking arm 400 to engage the locking arm engaging surface 332 of the locking cam 300 therein pivoting the locking cam 300 also about the central post 204 of the housing 200. This movement of the locking cam 300 forces the radial edge 302c of the locking cam 300 to forcefully pinch a portion of the elongated member 702 or 714 between the radial edge 302c of the locking cam 300 and the cable guide 231 of the housing 200 therein locking movement of the rope grab 100 in relation to the elongated member 702 or 714. If the force is great enough during the fall event, the energy absorber portion 404 of the locking arm 400 will straighten out to absorb energy and prevent injury to the user. The rope grab 100 will remain locked onto the elongated member 702 or 714 until the downward force of the fallen user is removed. As discussed above, also during a fall event, the gravitation forces on the cam lock 300 are overcome by the light biasing force of the cam spring 132 as well as by inertial forces, to also cause the cam lock 300 to lock onto the elongated members 702 or 714.

Figure 13A:
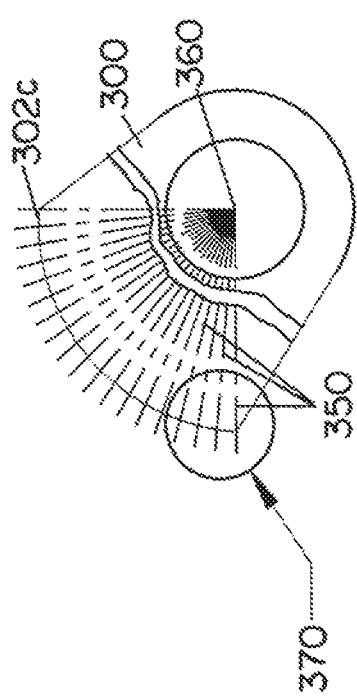
FIG. 13A is a partial side view of a locking cam of one embodiment.
Figure 13B:
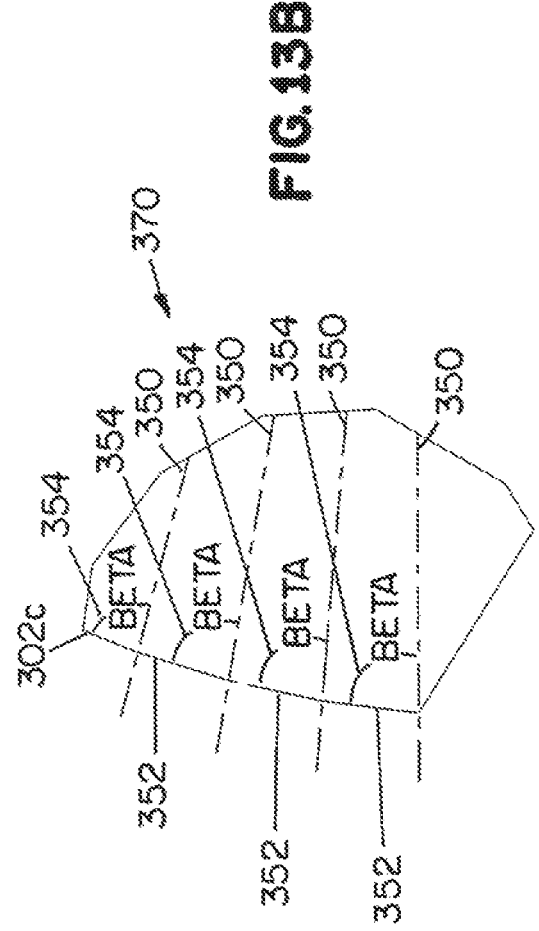
FIG. 13B is a close up view of a portion of a profile of a radial edge of the locking cam of FIG. 13A.

Referring to FIGS. 13A and 13B an explanation of achieving the same contact angle 720 with different sized elongated members 702 and 714 in one embodiment is provided. The profile of the radial edge 302c of the locking cam 300 for a given contact angle 720 (Alpha 1 and Alpha 2 in FIGS. 12A and 12B) is determined by dividing the locking cam 300 into multiple thin slices separated by planes 350 that are perpendicular to the profile of the radial edge 302c and pass through a rotational axis 360 of the locking cam 300. The profile of the radial edge 302c is generated by creating edges 352 that maintain an angle 354 (Beta) between the profile of the radial edge 302c of the locking cam 300 and the planes 350 separating the thin slices of the locking cam 300. Angle Beta 354 is equal to 90°−contact angle 720 (Alpha 1 or Alpha 2).

Embodiments of the present invention further includes a bypass bracket 800 that is designed to be coupled to a support structure and to hold an elongated member that the rope grab 100 is engaging in a generally static position. An example of a bypass bracket 800 is illustrated in FIGS. 14A and 14B. The bypass bracket 800 includes a base bracket 802. The base bracket 802 includes a first section 802a and a second section 802b. The second section 802b generally extends from the first section 802a in a perpendicular fashion. The first section 802a includes two spaced connection apertures 806a and 806b. The second section 802b of the base bracket 802 includes a first connection aperture 804a and a second connection aperture 804b. The bypass bracket 800 further includes a clamp member 810. This embodiment of the clamp member 810 is made from a plate that has a first side edge 810a and an opposably positioned second side edge 810b. The client member 810 further includes a top edge 810c and an opposably positioned bottom edge 810d. The clamp member 810 further includes a centrally positioned upper connection aperture 812 that is positioned proximate the upper edge 810c of the clamp member 810. The clamp member 810 also includes a slot 814 that extends in the first side edge 810a of the clamp member 810 proximate the lower edge 810d of the clamp member 810. In use, a support structure such as, but not limited to, a rung of a ladder is positioned between the first section 802a of the base bracket 802 and the clamp member 810. A fastener 816a then passes through a connection aperture 806a in the base bracket 802 and the upper connection aperture 812 of the clamp plate member 810. A nut 818a is then threadably engaged to the fastener 816a to couple an upper portion of the clamp member 810 to the base bracket 802. Similarly, a fastener 816b is passed through a connection aperture 806b of the base bracket 802 and within slot 814 of clamp member 810. Nut 818b is then threadably engaged to the fastener 816b to couple a lower portion of the clamp member 810 to the base bracket 802.

The bypass bracket 800 further includes a sleeve clip 820. The sleeve clip 820 includes a first portion 820a that has first and second connection apertures 823 (only one connection aperture 823 is shown in FIG. 14B). The connection apertures 823 are aligned with the first and second connection apertures 804a and 804b of the base bracket 802. Rivets 824a and 824b passing through the respective connection apertures 823, 804a and 804b couple the sleeve clip 820 to the base bracket 802. The sleeve clip 820 further includes a second portion 820b that extends from the first portion 820a in generally a perpendicular fashion. The second portion 820b includes holding ears 822a and 822b. The ears 822a and 822b are spaced by a central spaced portion 825. The first holding ear 822a has a generally C-shaped configuration with its open side facing a first direction. The second holding ear 822b is also in generally a C-shaped configuration with its open side facing a second direction that is generally opposite the first direction. The ears 822a and 822b form a receiving sleeve channel 821 that is formed from a first channel 821a formed by the first holding ear 822a and a second channel 821b formed by the second holding ear 822b.

A sleeve 830 is used in conjunction with the bypass bracket 800. The sleeve 830 has a tubular configuration with a central passage 832. An elongated member (such as elongated member 920 shown in FIG. 15A) is received within the central passage. The sleeve 830 further includes a first recess section 831a and a second recessed section 831b. The first and second recess sections 831a and 831b are recessed into an outer surface of the sleeve 830 in an opposable fashion. The first and second recessed sections 231a and 231b are spaced from each other by a mid-portion 830a of the sleeve 830. In particular, the first recess portion 831a is configured to receive the first holding ear 822a of the sleeve clip 820 and the second recessed portion 831b is configured to receive the second holding ear 822b of the sleeve clip 820. In use, once the bypass bracket 800 is coupled to the support structure as described above, the sleeve 830 (having the elongated member 920 passing through its central passage 832) is tilted in relation to the receiving sleeve channel 821 (approximately 90 degrees) and positioned such that the mid-portion of the sleeve 830 is received in the space 825 between the holding ears 822a and 822b of the sleeve clip 820. Once the mid-portion of the sleeve 830 is positioned within the space 825 between the holding ears 822a and 822b of the sleeve clip 820, the sleeve 830 is tilted to align with the receiving sleeve channel 821 of the sleeve clip 820, therein allowing the first ear 822a of the sleeve clip 820 to be received in the first recess 831a of the sleeve and the second holding ear 822b to be received in the second recess 831b of the sleeve 830. This locks the sleeve 830 within the sleeve clip 820 of the bypass bracket 800. This design allows the bypass brackets 800 to be attached to support structures prior to the connection to the elongated member 920.

The bypass bracket 800 is designed to hold the elongated member 920 stationary while not interfering with the function of the rope grab 100. Referring to FIGS. 15A through 15C an illustration of this is provided. The bypass bracket 840 in this embodiment, includes a clamp member 811 that has an edge with teeth 811a that are designed to grip the support structure 900. FIGS. 15A through 15C illustrated the rope grab 100 as it is passing across the bypass bracket 830. The side view of FIG. 15B illustrates the rope grab 100 without the fixed side plate 600 for illustration purposes. As illustrated the sleeve 830 that holds the elongated member 920 is received in the cable guide passage 230 of the rope grab 100. The locking cam 300 will allow it to pass unless a fall event occurs. If a fall event occurs when the sleeve 830 is within the cable guide passage 230, the locking cam 300 will lock down on the sleeve 830. Since, the sleeve 830 is locked to the bypass bracket 830 the rope grab 100 will remain stationary to limit the fall. In the top view illustrated in FIG. 15C, how the bypass bracket 840 does not interfere with the function of the rope grab 100 is shown. In particular, the second portion 820b of the sleeve clip 820 passes through the opening between the rotating side plate 500 and the cable guide 231 of the housing 200 to position the sleeve 830 and elongated member 920 within the cable guide passage 230 of the rope grab 100. A system may include a plurality of bypass brackets 840 to position a support structure 920 in a desired location.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A rope grab comprising:
 a housing having a body and an elongated member guide forming an elongated member passage, the elongated member passage configured and arranged to receive an elongated member;
 a locking cam pivotally coupled to the housing body at a first pivot point, the locking cam configured and arranged to selectively engage the elongated member received in the elongated member passage, the locking cam having a radial edge that is configured and arranged to engage the elongated member, the radial edge having a curvature that varies in relation to a pivot connection to the housing so that the radial edge engages the elongated member at a contact angle that is the same for a range of different diameters of the elongated member received in the elongated member passage of the housing; and
 a locking arm pivotally coupled to the housing body at a second pivot point in the housing body positioned at a different location than the first pivot point, the locking arm having a first end configured and arranged to be coupled to a safety harness of a user and a second end configured and arranged to selectively engage the locking cam to lock the locking cam on the elongated member during a fall event.

2. The rope grab of claim 1, further comprising:
a rotating side plate pivotally coupled to the housing to selectively block at least a portion of a side opening to the elongated member passage of the housing to selectively retain the elongated member within the elongated member passage.

3. The rope grab of claim 2, further comprising:
a fixed side plate coupled to the housing, the locking cam, the locking arm and the rotating side plate positioned between the fixed side plate and the housing;
a spring spacer positioned between the locking arm and the fixed plate, the spacer having a spring holding slot formed in an end of the spacer; and
an arm spring having a first end portion, a second end portion and a coiled portion positioned in between the first end portion and the second end portion, the coiled portion received around the spring spacer, the first end portion of the arm spring received in the spring holding slot of the spring spacer, the first end portion of the arm spring further engaging a portion of the housing, the second end portion of the arm spring engaging the locking arm to provide a biasing force on the locking arm.

4. The rope grab of claim 2, further comprising:
a roller coupled proximate an end of the rotating side plate, the roller configured to guide the elongated member through the elongated member passage.

5. The rope grab of claim 2, further comprising:
at least one lever;
a lock member coupled to rotate in response to the rotation of the at least one lever, the lock member configured and arranged to selectively engage the rotating side plate to lock the rotating side plate in a static position in relation to the housing to selectively block at least a portion of the side opening to the elongated member passage;
a lock spring coupled between the housing and the rotating side plate to provide a biasing force on the rotating side plate; and
a lever spring coupled between the housing and the at least one lever to provide a biasing force on the at least one lever.

6. The rope grab of claim 1, further comprising:
a cam spring coupled between the housing and the locking cam to provide a biasing force on the locking cam in a direction towards the elongated member received in the elongated member passage.

7. A rope grab comprising:
a housing having a body and an elongated member guide forming an elongated member passage, the elongated member passage configured and arranged to receive an elongated member;
a locking cam pivotally coupled to the housing at a first pivot point, the locking cam having a radial edge configured and arranged to selectively engage an elongated member received in the elongated member passage, the radial edge having a curvature that varies in relation to a pivot connection to the housing so that the radial edge engages the elongated member at a contact angle that is the same for a range of different diameters of the elongated member received in the elongated member passage of the housing;
a cam spring coupled between the housing and the locking cam to provide a biasing force on the locking cam in a direction towards an elongated member received in the elongated member passage;
a locking arm pivotally coupled to the housing body at a second pivot point in the housing body positioned at a different location than the first pivot point, the locking arm having a first end configured and arranged to be coupled to a safety harness of a user and a second end configured and arranged to selectively engage the locking cam to lock the locking cam on the elongated member during a fall event;
a rotating side plate pivotally coupled to the housing to selectively block a side opening to the elongated member passage of the housing;
a roller coupled to the rotating side plate proximate an end of the rotating side plate, the roller configured to guide the elongated member through the elongated member passage; and
a fixed side plate coupled to the housing, the locking cam, the locking arm and the rotating side plate positioned between the fixed side plate and the housing.

8. The rope grab of claim 7, further comprising:
a spring spacer positioned between the locking arm and the fixed plate, the spacer having a spring holding slot formed in an end of the spacer; and
an arm spring having a first end portion, a second end portion and a coiled portion positioned in between the first end portion and the second end portion, the coiled portion received around the spring spacer, the first end portion of the arm spring received in the spring holding slot of the spring spacer, the first end portion of the arm spring further engaging a portion of the housing, the second end portion of the arm spring engaging the locking arm to provide a biasing force on the locking arm.

9. The rope grab of claim 7, further comprising:
at least one lever;
a lock member coupled to rotate in response to the rotation of the at least one lever, the lock member configured and arranged to selectively engage the rotating side plate to lock the rotating side plate in a static position in relation to the housing to selectively block at least a portion of the side opening to the elongated passage;
a lock spring coupled between the housing and the rotating side plate to provide a biasing force on the rotating side plate; and
a lever spring coupled between the housing and the at least one lever to provide a biasing force on the at least one lever.

10. A rope grab comprising:
a housing having an elongated member guide forming an elongated member passage, the elongated member passage configured and arranged to receive different diameter sized elongated members;
a locking cam pivotally coupled to the housing body at a first pivot point along a rotational axis, the locking cam having a radial edge that is configured and arranged to engage an elongated member received in the elongated member passage;
a cam spring coupled between the housing and the locking cam to provide a biasing force on the locking cam towards an elongated member received in the elongated member passage, the biasing force being countered by gravity during normal operations of the rope grab; and
a locking arm pivotally coupled to the housing body at a second pivot point in the housing body positioned at a different location than the first pivot point, the locking arm having a first end configured and arranged to be coupled to a safety harness of a user and a second end configured and arranged to selectively engage the locking cam to selectively lock the locking cam on an elongated member in the elongated member passage during a fall event.

11. The rope grab of claim 10, further comprising:
a rotating side plate pivotally coupled to the housing to selectively block a side opening to the elongated member passage of the housing.

12. The rope grab of claim 11, further comprising:
a side plate spring coupled between the housing and the rotating side plate to provide a biasing force on the rotating side plate.

13. The rope grab of claim 11, further comprising;
at least one lever;
a lever spring coupled between the housing and the at least one lever to provide a biasing force on the at least one lever;
a lock member coupled to rotate in response to the rotation of the at least one lever, the lock member configured and arranged to selectively engage the rotating side plate to lock the rotating side plate in a static position in relation to the housing to selectively block at least a portion of the side opening to the elongated passage; and
a lock spring coupled between the housing and the rotating side plate to provide a biasing force on the rotating side plate.

14. The rope grab of claim 13, wherein the at least one lever and the rotating side plate are positioned in relation to each other to allow activation of the at least one lever and rotation of the rotating side plate with a single hand of a user.

* * * * *